June 15, 1965 R. M. BRUMBAUGH 3,189,239

DIGITAL TAPE TRANSPORT

Filed Feb. 16, 1961 5 Sheets-Sheet 1

INVENTOR.
Robert M. Brumbaugh
BY
Hovey, Schmidt, Johnson & Hovey
ATTORNEYS.

INVENTOR.
Robert M. Brumbaugh
BY
Hovey, Schmidt, Johnson & Hovey
ATTORNEYS.

June 15, 1965 R. M. BRUMBAUGH 3,189,239

DIGITAL TAPE TRANSPORT

Filed Feb. 16, 1961 5 Sheets-Sheet 3

INVENTOR.
Robert M. Brumbaugh

BY

Hovey, Schmidt, Johnson & Hovey
ATTORNEYS.

INVENTOR.
Robert M. Brumbaugh
BY
Hovey, Schmidt, Johnson & Hovey
ATTORNEYS.

INVENTOR.
Robert M. Brumbaugh
BY
Hovey, Schmidt, Johnson & Hovey
ATTORNEYS.

3,189,239

DIGITAL TAPE TRANSPORT

Robert M. Brumbaugh, Tulsa, Okla., assignor, by mesne assignments, to Midwestern Instruments, Inc., Tulsa, Okla., a corporation of Oklahoma Filed Feb. 16, 1961, Ser. No. 89,792
32 Claims. (Cl. 226—95)

This invention relates to a high speed digital tape transport which is utilized with data reduction systems such as with the input or output equipment of a digital computer.

The present invention is a conventional reel-to-reel type tape machine for driving an elongated, flexible tape coated with a material susceptible to magnetic excitation past a conventional read-write head for transferring data from the tape or imparting data thereto as the tape passes the head. To maintain constant tension on the tape as the same is accelerated or decelerated past the head, improved tensioning means is provided which include pneumatic apparatus for providing a differential air pressure across a pair of loops in the tape on opposed sides of the read-write head.

The tape tensioning apparatus comprises a pair of evacuated chambers within which the tape is disposed in a looped condition and the tension on the tape is derived from the differential pressures across the loops. Each of the chambers is provided with one wall having a plurality of vertically spaced perforations therein in fluid communication with a manifold operably coupled with a pressure-sensing transducer. Thus, by virtue of this construction, the position of the tape loops in the chambers may be sensed and an aerosignal may be created which is proportional to the position of the loops on either side of a null position. Such aerosignal is utilized to actuate the transducers to thereby operate reel motors coupled with the latter for returning the tape loops toward the null position thereof, thus maintaining constant tension on the tape at all times. A linear relationship between the tape loop position and the voltage output from the transducers to the reel motors is obtained with the aforementioned construction, so that a displacement of each tape loop on each side of the corresponding null position is sufficient to actuate the corresponding reel motor by the proper amount for returning the loop to the normal or null position.

The present invention also contemplates the use of improved tape drive capstan means utilizing positive air pressures for moving the tape into and out of engagement with a pair of contra-rotating capstans, one of which is for driving the tape in a forward direction and the other of which is for driving the tape in the reverse direction.

Heretofore, digital tape transports have utilized pneumatic means for driving the tapes thereof by providing air suction means acting upon a tape for pulling the same into engagement with the capstan having an air passage operably coupled with a vacuum device. Although such a device has worked satisfactorily in many instances, inherent problems are always present which limit the effectiveness thereof, the foremost of which is that a limit exists on the extent to which a vacuum or decreased pressure may be applied to the capstan means, thus providing a somewhat less effective means for driving tape, especially at a considerably high speed as is required by present-day equipment.

By the use use of positive air pressures as is contemplated by the present invention, the tape is more positively driven by being forced into engagement with the rotating capstan so that the tape is responsive instantaneously to the effect of the rotation of the corresponding capstan. Further, the fact that extremely high positive air pressures may be created more in contrast to the usual limits in creating high vacuums, makes the structure of the present invention more desirable as a tape drive means than that heretofore disclosed.

It is, therefore, the primary object of the present invention to provide a digital tape transport having improved tape-tensioning means and tape-drive means thereon whereby the tape is maintained more effectively at a constant tension and more positively driven past a read-write head to thereby decrease to a minimum the errors inherent in a system of this nature.

Another object of the present invention is the provision of a digital tape transport having tape-tensioning means which provide an aerosignal proportional to the location of tape loops within vacuum chambers on the transport so that the aerosignal may be converted into an electrical signal to drive the tape reel motors and thus maintain the tape in a predetermined position within the chambers.

Still another object of the present invention is the provision of tape-tensioning means utilizing a vacuum chamber having a first wall provided with a plurality of vertically spaced apertures therein, which apertures are in fluid communication with a manifold operably coupled to a transducer so that the position of the tape within the chamber is effectively sensed and an aerosignal is produced, depending upon the location of the tape within the chamber to drive the tape reel motor to maintain the tape loop substantially at a null position at all times.

Yet another object of the present invention is the provision of a tape transport having pneumatic tape drive capstan means thereon for maintaining the tape out of engagement with the capstan means while the machine is in a stand-by condition so that the tape is not damaged while the same is in the said condition.

A further object of the present invention is the provision of contra-rotating capstan means for driving a tape past a read-write head and including air passages in the capstan means for directing air through the latter and against the tape for maintaining the tape out of engagement with the capstan means while the transport is inoperative, thus preventing damage to the tape by removal of the coating thereon.

Another object of the present invention is the provision of a tape drive capstan means utilizing a pair of hollow capstans through which air is passed, and pneumatic means for each capstan for directing air against the latter so that when a first positive air pressure is sustained in the capstan for maintaining the tape out of engagement with the latter, a second positive air pressure is directed against the tape and overcoming the first air pressure to move the tape into engagement with the capstan to be driven thereby.

Yet a further important object of the present invention is the provision of brake means for stopping the tape after the same has been driven by capstan means, which brake means is operably coupled to a source of positive air pressure so that the same may be utilized to force the tape into engagement with one face of a projection to thereby instantaneously stop the tape from further movement.

Other objects of the present invention relate to the provision of a porous sleeve on each of the rotating capstans to permit air to pass therethrough and against tape disposed over the sleeve so that the tape is effectively maintained out of engagement with the sleeve and thereby the rotating capstan; to the provision of valve means operably coupled with the pneumatic means for creating a positive air pressure for forcing the tape into engagement with the rotating capstans whereby the air is directed to either the pneumatic means or to the brake means to thereby drive or stop the tape as is desired; to the provision of a valve having a shiftable reed therein for opening and closing a pair of outlets, whereby an electrical impulse will shift the reed from a first position closing one of the outlets, to a second position closing the other outlet; to the provision of a reed having magnetic characteristics whereby the reed may be magnetically polarized by disposing the same within close proximity to a current carrying coil, and a permanent magnet so that upon being polarized, the reed moves in the direction of the magnet and thus in a position closing one or the other of the outlets; to the provision of bleed valve means in the conduits interconnecting an air source with the means for driving the tape and the brake means whereby the air may be removed from the conduit to the atmosphere when it is desired to remove the positive air from the driving means or the brake means; to the provision of a bleed valve having a disc closing the inlet thereof and movable to a position opening the inlet by being magnetically polarized by a current-carrying coil, whereby upon the creation of a signal to the coil, the disc is moved to thereby open the inlet and provide a path for the air passing therethrough to the atmosphere; to the provision of a pair of swingable arms mounted on an upright panel forming a part of the digital tape transport for carrying the pneumatic tape drive means, whereby the arms may be swung into and out of positions overlying the tape and moving the pneumatic means into tape driving relationship relative to the capstans; and to the provision of a brake block disposed adjacent to one of the swingable arms, whereby the tape may be driven by the brake block into engagement with the arm when it is desired to stop the movement of the tape.

Other objects of the present invention will become apparent as the following specification progresses, reference being had to the accompanying drawings, wherein.

Figures 1, 7, 8:
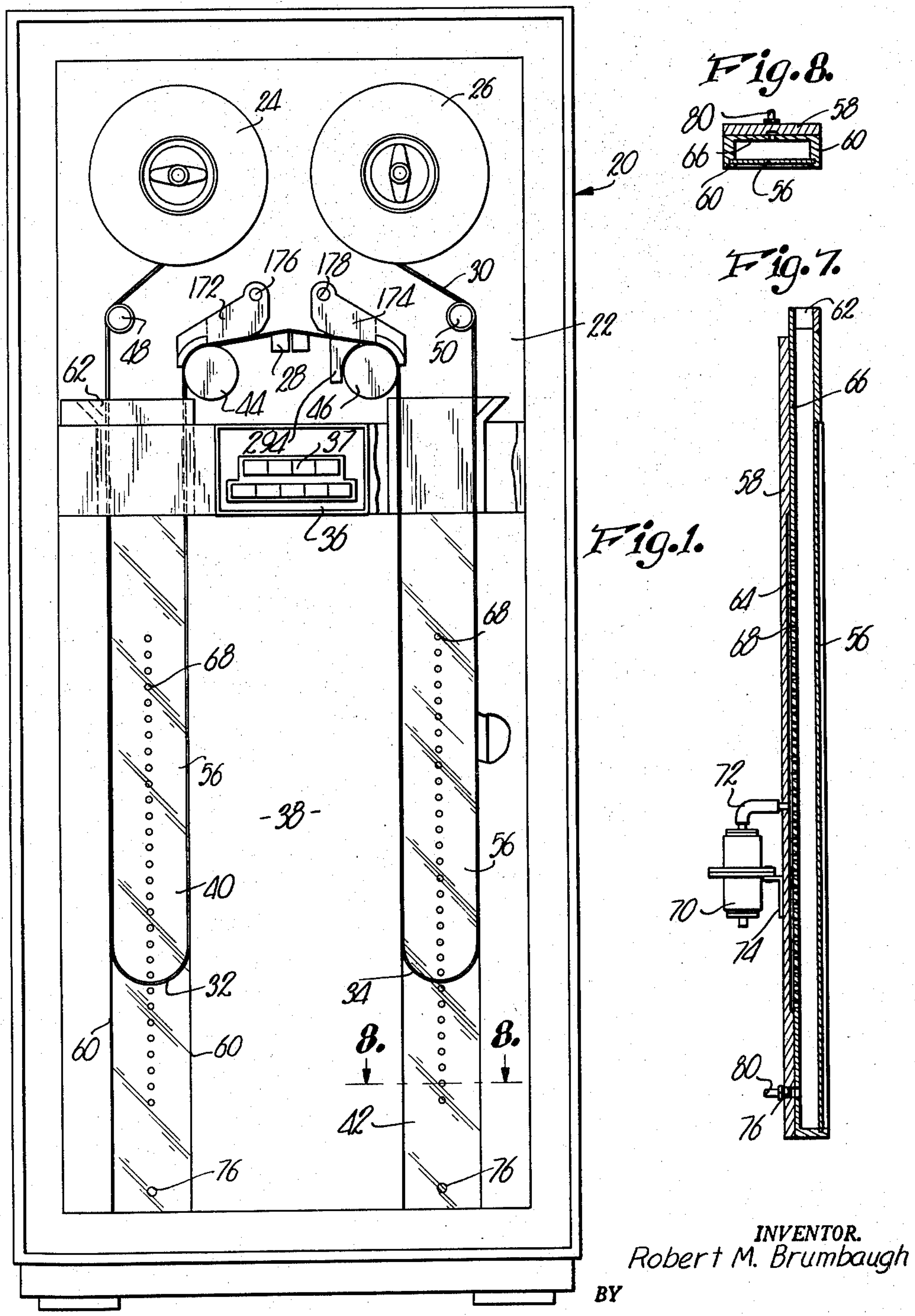
FIGURE 1 is a front elevational view of the digital tape transport which forms the subject of the present invention.
FIG. 7 is an enlarged, fragmentary, cross-sectional, side elevational view of the tape-tensioning means forming a portion of the present invention, illustrating the connection therewith of a transducer in the form of a differential transformer.
FIG. 8 is a cross-sectional, plan view of the tape-tensioning means illustrated in FIG. 7.

The digital tape transport which is the subject of the present invention is broadly enumerated by the numeral 20, and comprises an upright panel 22 upon which is rotatably mounted a pair of tape supply reels 24 and 26 above and on either side of a conventional read-write head 28. A flexible tape 30 passes between reels 24 and 26 and over head 28, there being a loop 32 in tape 30 below reel 24 and a loop 34 in tape 30 below reel 26.

Transport 20 is to be primarily used as the input or output equipment to data reduction systems such as a digital computer, and to this end is provided with a control panel 36 having a plurality of switches 37 thereon for imparting commands thereto through electronic equipment (not shown) disposed in region 38 below panel 36.

Transport 20 is provided with tape-tensioning means in the form of a pair of tape wells 40 and 42 providing chambers within which loops 32 and 34 are disposed. In addition, tape drive means is provided for transport 20 and includes a pair of contra-rotating capstans 44 and 46 on opposed sides of head 28 and below reels 24 and 26. Capstan 44 rotates in a counterclockwise direction as viewed in FIG. 1, to thus provide the reverse drive for tape 30, and capstan 46 rotates in a clockwise sense when viewing FIG. 1 to thereby provide the forward drive for tape 30.

Tape 30 passes over idlers 48 and 50 on opposed sides of capstans 44 and 46 below reels 24 and 26, the latter being driven by motors 52 and 54 respectively which are operably coupled to a source of electrical power (not shown), it being clear that motors 52 and 54 may rotate the respective reels 24 and 26 in either a clockwise or counterclockwise direction when viewing FIG. 1. Thus, reel 24 being the supply reel, may supply tape, or take-up tape from chamber 40 and reel 26 being the take-up reel, may take up or supply tape to chamber 42.

Each of chambers 40 and 42 are substantially identical, for the same operate on identical loops and therefore, only one of the chambers need be illustrated and described. Chamber 40, for example, is comprised of a front wall 56 of transparent material such as glass or plastic, and a rear wall 58 which may form the bottom area of panel 22. The sides 60 of chamber 40 are substantially equal in width to the width of the tape 30 to be utilized within the chamber 40, so that when tape 30 is disposed within chamber 40, the tape loop 32 forms a partition in chamber 40, dividing the same into a pair of compartments, the lower of which is substantially air-tight, and the upper of which is open to the atmosphere at the upper end 62 thereof.

Rear wall 58 is provided with an elongated slot 64 therein which may be milled or formed by any suitable manner, and extends a considerable distance along the longitudinal axis of wall 58 and terminate in spaced relationship to the upper and lower ends thereof. A perforated sheet 66 is secured to wall 58 in any suitable manner and is provided with a plurality of apertures 68 therein which are disposed adjacent to slot 64 and places the latter in fluid communication with the region of chamber 40 between the front and rear walls 56 and 58 thereof. Apertures 68 are vertically spaced by predetermined distances and are substantially of the same diameter.

A transducer 70 in the nature of a differential transformer is pneumatically coupled to slot 64 by means of a stretch 72 of tubing, it being clear that transducer 70 is provided with a diaphragm or bellows therewithin operably coupled to a shiftable core disposed within a cylindrical coil adapted to be operably coupled to a source of electrical power. Transducer 70 is mounted in any suitable manner on rear wall 58 such as by a bracket 74.

Rear wall 58 and sheet 66 are both perforated at the lowermost ends thereof to provide an inlet 76 for interconnecting chamber 40 with a vacuum system 78 for evacuating the lower compartment of chamber 40 when loop 32 is disposed therein. Suitable tubing 80 is provided for interconnecting the vacuum system 78 with inlet 76 and a vacuum meter 82 is provided on system 78 to record the instantaneous pressure of the same relative to that of the atmosphere.

Thus, it is evident that when tape loop 32 is disposed within chamber 40 and vacuum system 78 is put into operation, the lower compartment of chamber 40 between the lower wall thereof and tape loop 32, is at an air pressure below that of the atmosphere equal to that recorded by meter 82 coupled to system 78. Since the upper compartment of chamber 40 is open to the atmosphere, a differential air pressure exists across tape loop 32 and, in view of the differential air pressure across tape loop 34 in chamber 42, tape 30 is maintained at a predetermined tension, dependent upon the reduced air pressure created by vacuum system 78 and the pressure of the atmosphere surrounding transport 20.

If, for any reason, loop 32 of tape 30 should rise above or below a predetermined null position defined by a position in which there would be no signal output from transducer 70, the transducer 70 would be provided with an aerosignal from slot 64 which would be proportional to the position of loop 32 within chamber 40. Thus, the transducer 70 would create a positive or negative electrical signal which would be impressed upon motor 52 of reel 24 to thereby drive the latter in the appropriate direction to return loop 32 substantially to the null position.

For example, if loop 32 were to rise in chamber 40, an increased number of apertures 68 would be placed in fluid communication with the lower compartment of chamber 40 and thus be acted upon by the vacuum. Transducer 70 would sense the rise of loop 32 within chamber 40 since the diaphragm within transducer 70 would respond to the increase in the number of apertures 68 being placed in communication with the lower compartment of chamber 40. Thus, the diaphragm would shift in one direction to thereby move the shiftable core in the same direction, creating an electrical signal of a given polarity and value, depending upon the direction of movement of loop 32. The electrical signal would then be impressed on motor 52 to drive the latter in a direction so as to rotate reel 24 in a clockwise sense to thereby supply more tape to chamber 40 and return loop 32 to the null position. As loop 32 approaches the null position, the signal to the motor 52 would progressively decrease until the same would be substantially eliminated, at which time loop 32 would again be at the null position.

Should loop 32 drop below the null position, a greater number of the apertures would be exposed to the atmosphere or to the upper compartment of chamber 40, and transducer 70 would sense this greater number of apertures by the movement of the diaphragm in the direction opposite to that when loop 32 is above the null position. Thus, the core of the coil would move in the opposite direction and create an electrical signal having a polarity opposed to that when loop 32 is above the null position and having a value depending upon the position of the tape loop 32 below the null position.

Thus, the signal imparted to motor 52 is linearly proportional to the position of tape loop 32 above and below the null position thereof so that motor 52 instantaneously reacts to any change of loop 32 relative to the null position thereof. Should nonlinearities exist in the relation between electrical signal output of transducer 70 and position of tape loop 32 within chamber 40, apertures 68 may be enlarged or spaced apart greater distances to thereby effectively increase or decrease the aerosignal imparted to the transducer 70. The resulting electrical signal impressed upon motor 52 is thereby changed accordingly so as to maintain the linearity in the relation between aerosignal and electrical signal.

Each of rotating capstans 44 and 46 is substantially identical with the other capstan and therefore, it is sufficient merely to describe one of such capstans in detail.

Figure 9:
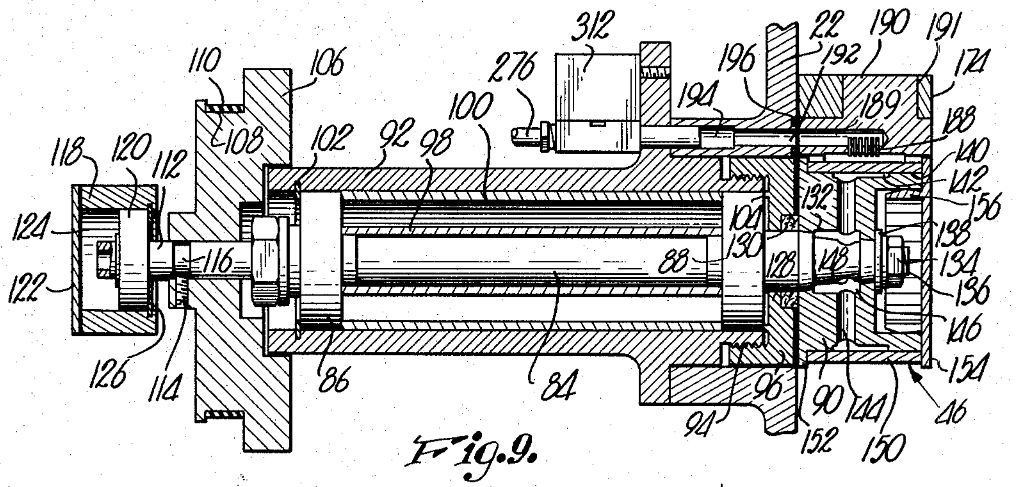
FIG. 9 is an enlarged, cross-sectional, side elevational view of one of the rotating capstans and showing the position thereof with the structure on the arm thereabove for forcing the tape into engagement therewith, which view is taken along line 9—9 of FIG. 4.

Capstan 44 is comprised of an elongated, tubular element 84 to which a pair of bearings 86 and 88 are secured proximal to the ends thereof, and a spool 90 connected to element 84 at the end thereof adjacent bearing 88. Bearings 86 and 88 are of any suitable type, preferably of the roller type, and are disposed within a cylindrical sleeve 92 having an externally threaded end 94 received within an internally threaded projection 96 integral with panel 22 in the manner set forth in FIG. 9. Cylindrical spacers 98 and 100 surround element 84 concentrically and are positioned in abutting relationship to bearings 86 and 88 to more ridigly mount capstan 44 on panel 22.

An annular spring clip 102 is embedded in sleeve 92 adjacent to and in abutting relationship to the bearing 86 to thus maintain the latter therewithin and to urge bearing 88 into engagement with an annular projection 104 integral with panel 22 and extending into the region defined by projection 96. Thus, element 84 is maintained within sleeve 92 owing to the fact that the inner race of each of bearings 86 and 88 is connected rigidly to element 84.

A pulley 106 having a belt groove 108 therein for receiving a belt 110, is rigidly secured to the end 112 of element 84 spaced from panel 22 by means of a setscrew 114 extending through an opening in pulley 106 and abutting end 112 within a groove 116 in the latter. A cylindrical device 118 is mounted on end 112 of element 84 by means of being in engagement with the outer race of a bearing 120, the latter having an inner race rigidly secured to end 112 to permit element 84 to rotate relative to device 118. A cap 112 covers one end of device 118 to define an air-tight chamber 124 which is in fluid communication with the tubular passage in element 84. An annular spring clip 126 is embedded in device 118 proximal to the opposite end thereof to maintain bearing 120 within the latter and thereby form one wall of chamber 124.

The opposite end of element 84 projects through an opening 128 in panel 22 and is rotatable relative to the latter when rotational motion is imparted to element 84 by pulley 106 and belt 110. A felt packing 130 surrounds the opposite end of element 84 and provides a dust seal therefor.

Spool 90 is provided with a central opening 132 therein for receiving the opposite end of element 84, it being clear that the opposite end of the latter and spool 90 are provided with complemental, frusto-conical surfaces therefor, fitting spool 90 on element 84. A nut 134 is threadably mounted on an externally threaded portion 136 of element 84 and abuts against washers 138 which in turn engage spool 90 within a recess of the latter formed by removing a portion thereof concentric with the axis of revolution thereof. Thus, spool 90 is maintained in engagement with element 84 and is rotatable therewith.

Spool 90 is provided with a peripheral outer surface 140 having an annular depression 142 therein concentric with the axis of revolution thereof. A plurality of air passages 144 place depression 142 in fluid communication with an air pocket 146, the latter being in fluid communication with the interior of element 84 through openings 148 in the latter.

An annular porous sleeve 150 is fitted over surface 140 of spool 90, and a peripheral edge of sleeve 150 abuts an annular flange 152 integral with spool 90. A cap member 154 provides a retainer means for retaining sleeve 150 on spool 90 and is provided with an annular clip 156 receivable in the central recess of spool 90 and press-fitted therewithin.

Sleeve 150 is porous to the extent that the same is capable of permitting air to pass therethrough. It is, therefore, clear that when air is forced into chamber 124 under pressure, the same passes through element 84, out of openings 148 into pocket 146, through passages 144 into depression 142, and thence out of the latter through porous sleeve 150.

Figure 2:
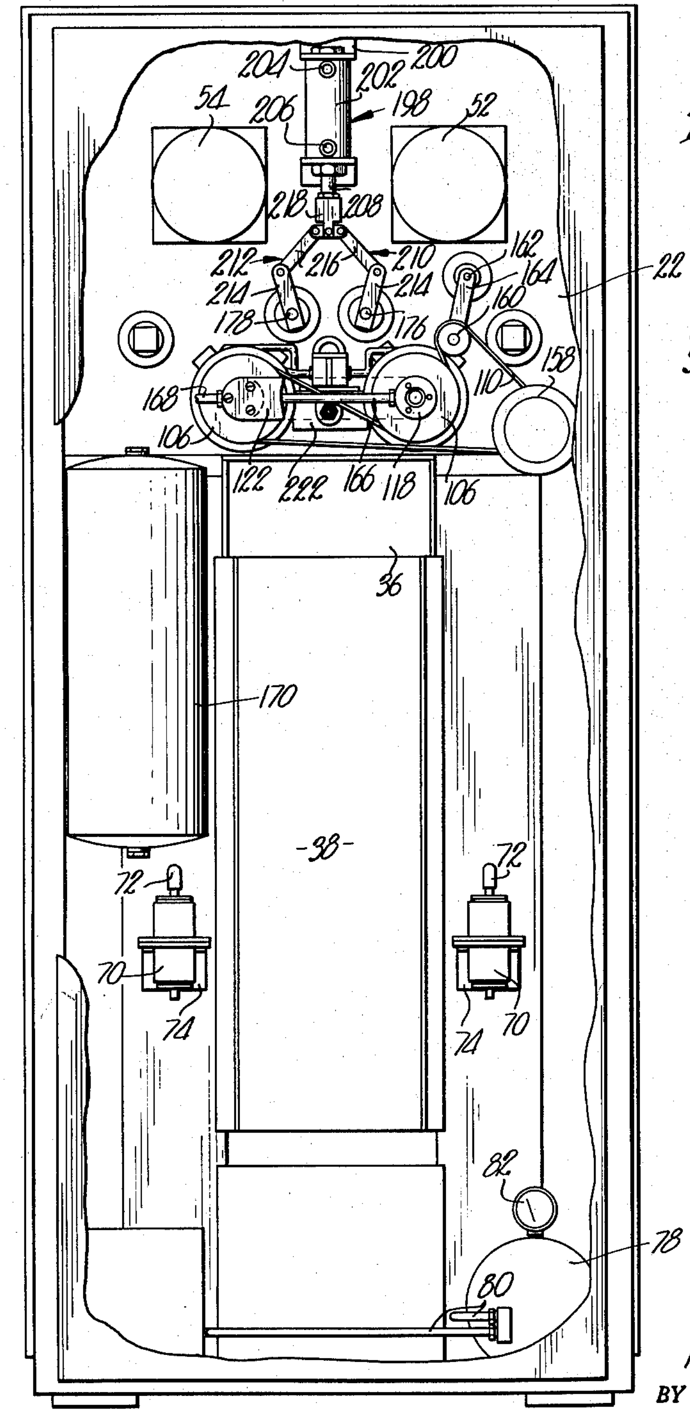
FIG. 2 is a rear elevational view of the transport illustrated in FIG. 1.
Figure 14:
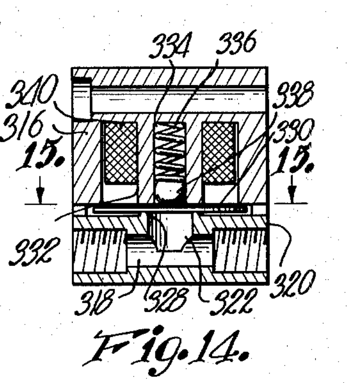
FIG. 14 is a cross-sectional, side elevational view of a bleed valve forming a part of the pneumatic means operably coupled with the capstans and the brake.
Figure 15:
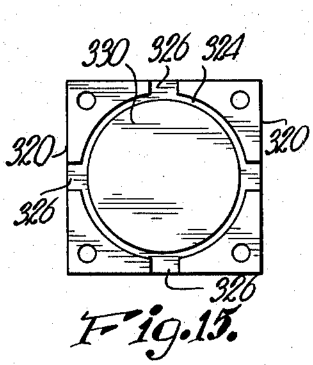
FIG. 15 is a bottom plan view taken along line 15—15 of FIG. 14.
Figure 4:
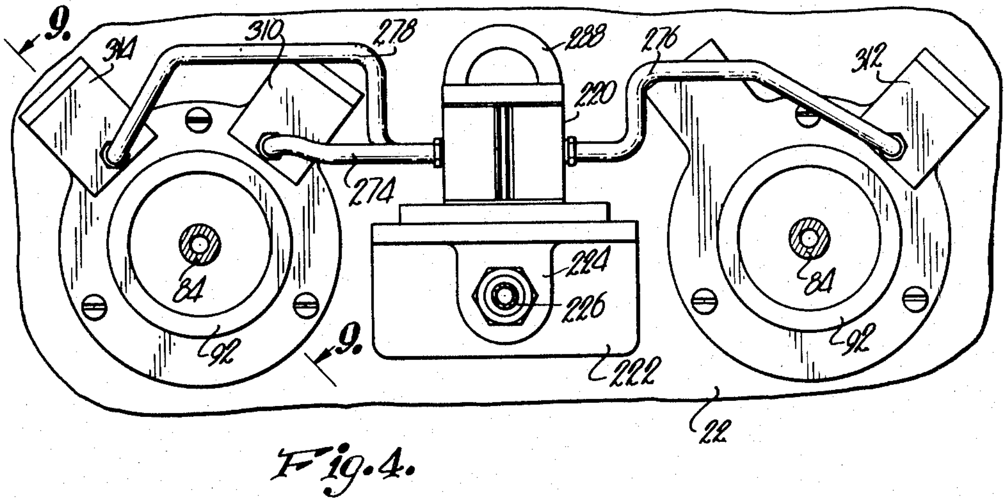
FIG. 4 is an enlarged, fragmentary, cross-sectional, elevational view of the tape drive capstan means as viewed from the rear of FIG. 3, illustrating the pneumatic interconnections between the valves which form a part of the pneumatic structure therefor.
Figure 3:
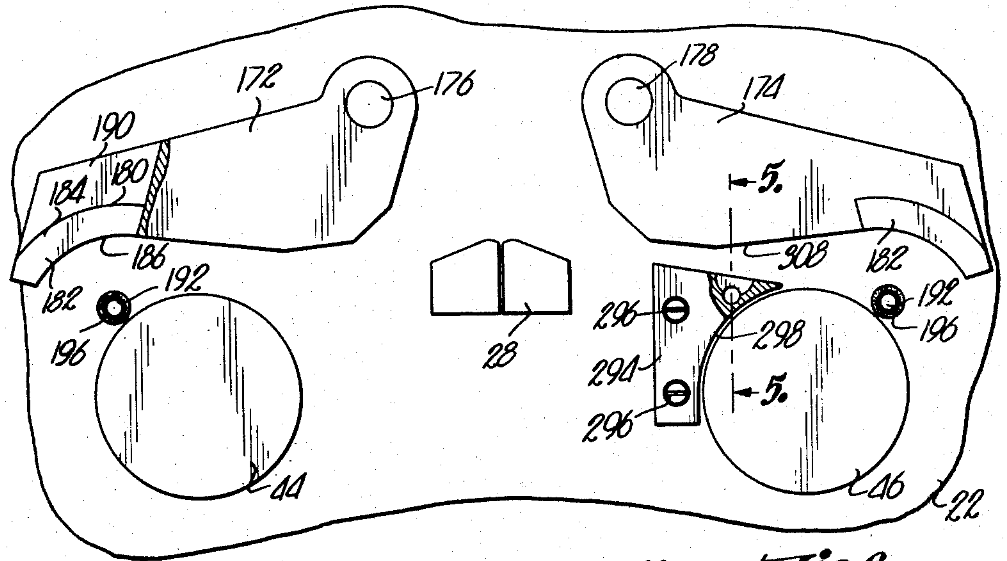
FIG. 3 is an enlarged, fragmentary, cross-sectional, elevational view of the tape drive capstan means mounted on the transport illustrating the relative positions of the capstans with the read-write head on the transport and the swingable arms for forcing the tape into engagement with the capstans.
Figure 6:
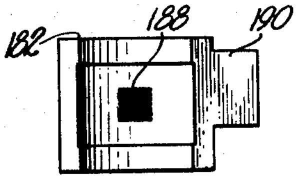
FIG. 6 is a bottom plan view of the structure carried by the swingable arms of FIG. 3 for forcing the tape into engagement with the corresponding capstan.
Figure 5:
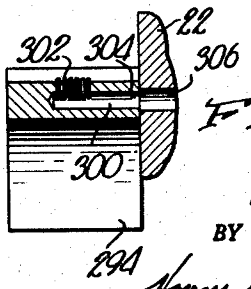
FIG. 5 is an enlarged, fragmentary, cross-sectional, side elevational view taken along line 5—5 of FIG. 3.

To rotate element 84 and thereby spool 90, rotation is imparted to pulley 106 by virtue of belt 110 passing into operable engagement with a rotatable motor 158 secured to the rear face of panel 22, and projecting outwardly therefrom. To permit the pulleys 106 of capstans 44 and 46 to rotate the corresponding capstans in opposing directions, belt 110 is looped over the pulleys 106 in the manner shown in FIG. 2 of the drawings so as to rotate one of the pulleys 106 in one direction and to rotate the other pulley 106 in the opposite direction. To this end, an idler pulley 160 is provided adjacent one of pulleys 106 and is suspended from a point 162 on panel 22 by means of a leg 164 rotatably mounted for movement about point 162. Thus, when viewing FIG. 2, and assuming that motor 158 rotates in a counterclockwise sense, pulley 106 corresponding to capstan 44, will rotate in a clockwise sense when viewing FIG. 2, and pulley 106 corresponding to capstan 46 will rotate in a counterclockwise sense when viewing FIG. 2.

A tube 166 interconnects chambers 124 of devices 118 for placing the same in fluid communication, and a pipe 168 leads off from one of devices 118 and is adapted to be operably coupled to a source 170 of air pressure so as to supply air to capstans 44 and 46 through respective elements 84 and spools 90. When it is desired to impart air to capstans 44 and 46, suitable mechanism for controlling the air from source 170 to capstans 44 and 46, is actuated so as to direct air through elements 84, spools 90 and through porous sleeves 150. Thus, if tape 30 is disposed over sleeves 150, the same are moved out of engagement with said sleeves by virtue of the positive air pressure exerted on tape 30, and in conjunction with the tensioning of the tape by the means hereinabove set forth, tape 30 may be maintained out of engagement with the sleeves 150 and spaced therefrom by predetermined distances. In view of the fact that capstans 44 and 46 are continuously rotated by motor 158, tape 30 is effectively maintained out of engagement with sleeves 150 during stand-by conditions of transport 20, or during inoperation thereof. Tape 30 is thereby precluded from being damaged by being in contact with sleeves 150 since the coating thereon remains intact during the standby condition of transport 20.

A pair of arms 172 and 174 are swingably mounted on panel 22 about pin means 176 and 178 respectively, projecting outwardly from the front face of panel 22 so as to dispose arms 172 and 174 proximal to and above respective capstans 44 and 46. Arms 172 and 174 are substantially identical and, therefore, the description of one will suffice for the description of the other.

Arm 172 is provided with an arcuate depression 180 therein for receiving a tubular member 182, having a convex surface 184 in complemental engagement with depression 180 of arm 172, and a concave surface 186 disposed to face toward capstan 44 at all times. Surface 186 is provided with a plurality of elongated slots 188 therein communicating with a tubular air duct 189 therethrough, and providing an outlet therefor for air passing through the duct. An extension 190 is integral with member 182 and extends into a recess 191 adjoining depression 180 of arm 172 and is secured to the latter by any suitable means such as by press-fitting the same within the recess 191. The outlet of duct 189 is movable into and out of a position aligned with outlet 192 of conduit means 194 operably coupled to source 170 through apparatus hereinafter described and extending through panel 22. An O-ring 196 is embedded in an annular recess surrounding outlet 192 and projects outwardly therefrom to engage member 182 when the latter is in a position with the air duct 189 thereof in alignment with the outlet 192. O-ring 196 seals the interconnection, between panel 22 and member 182 when the latter is in the said position with the air duct 189 thereof aligned with the outlet 192.

Means for swinging arms 172 and 174 about respective pin means 176 and 178 comprises a cylinder and piston unit 198 mounted in any suitable manner such as by a bracket 200 on the rear face of panel 22. Unit 198 is provided with a cylinder 202 having a pair of ports 204 and 206 through which a fluid, either pneumatic or hydraulic, may flow to shift a piston (not shown) within cylinder 202, the piston being secured to a piston rod 208 projecting outwardly from one end of cylinder 202 and operably interconnected with a pair of linkages 210 and 212. Ports 204 and 206 are preferably connected in any suitable manner through control mechanism to source 170 so that the piston within cylinder 202 is actuated by air from source 170.

Linkages 210 and 212 are substantially identical and each comprises a pair of pivotally interconnected legs 214 and 216, leg 214 of linkage 210 being rigidly interconnected to pin means 176 extending through and projecting outwardly from the rear face of panel 22, and leg 214 of linkage 212 being rigidly connected to pin means 178 laterally spaced from pin means 176. The proximal extremities of legs 216 of linkages 210 and 212 are pivotally interconnected to an adaptor 218 rigid to rod 208. It is evident therefore, that when rod 208 moves downwardly under the action of fluid directed into port 204, pin means 176 rotates in a clockwise sense viewing FIG. 2, and pin means 178 rotates in a counterclockwise sense viewing the same figure. Thus, arms 172 and 174 are swung downwardly into the position illustrated in FIG. 1 so that the members 182 are in position to force tape 30 into engagement with porous sleeves 150. When rod 208 is shifted upwardly under the influence of fluid passing into port 206, pin means 176 and pin means 178 rotate in the directions opposed to the directions set forth above to thereby swing arms 172 and 174 away from the respective capstans 44 and 46.

Means for supplying air to members 182 comprises a control valve 220 coupled with source 170 in a manner hereinafter set forth. Valve 220 is mounted on a bracket 222 secured to the rear face of panel 22 and a depending portion 224 is secured to bracket 222 to provide a supporting means for a conduit 226 and connected to base 228 of valve 220 in fluid communication with an inlet 230 for the latter, and conduit 226 is further connected to source 170 through suitable controlling mechanism (not shown) such as an electrical switching system.

Figure 12:
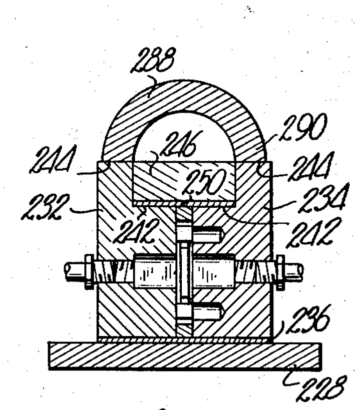
FIG. 12 is a cross-sectional, end elevational view taken along line 12—12 of FIG. 10.
Figure 10:
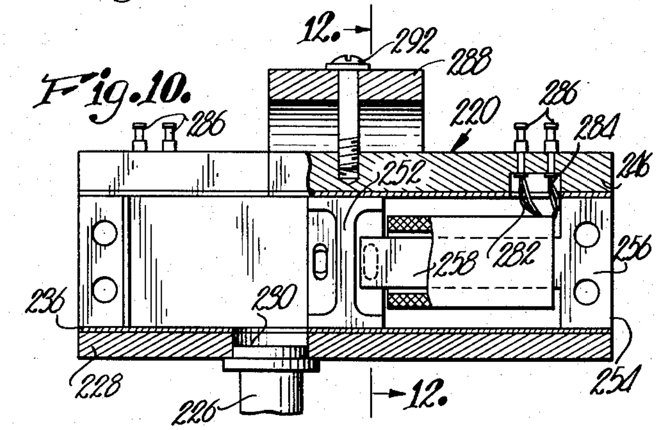
FIG. 10 is a fragmentary, cross-sectional, side elevational view of the control valve forming a part of the pneumatic means operably coupled to the rotating capstans, which view is taken along line 10—10 of FIG. 11.
Figure 13:
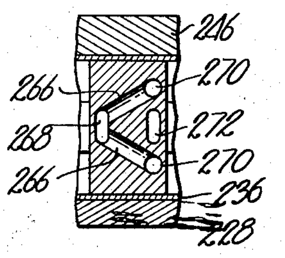
FIG. 13 is a fragmentary, cross-sectional, side elevational view taken along line 13—13 of FIG. 11.
Figure 11:
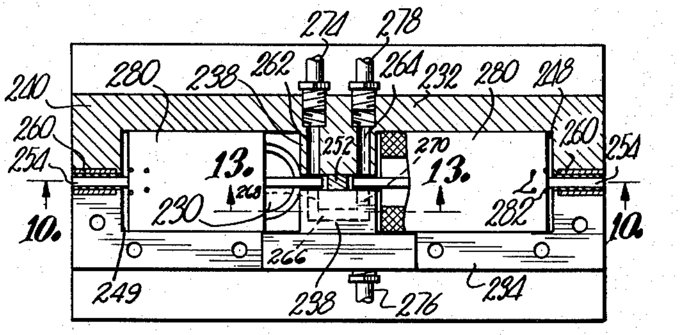
FIG. 11 is a cross-sectional, plan view of the valve illustrated in FIG. 10.
Figure 16:
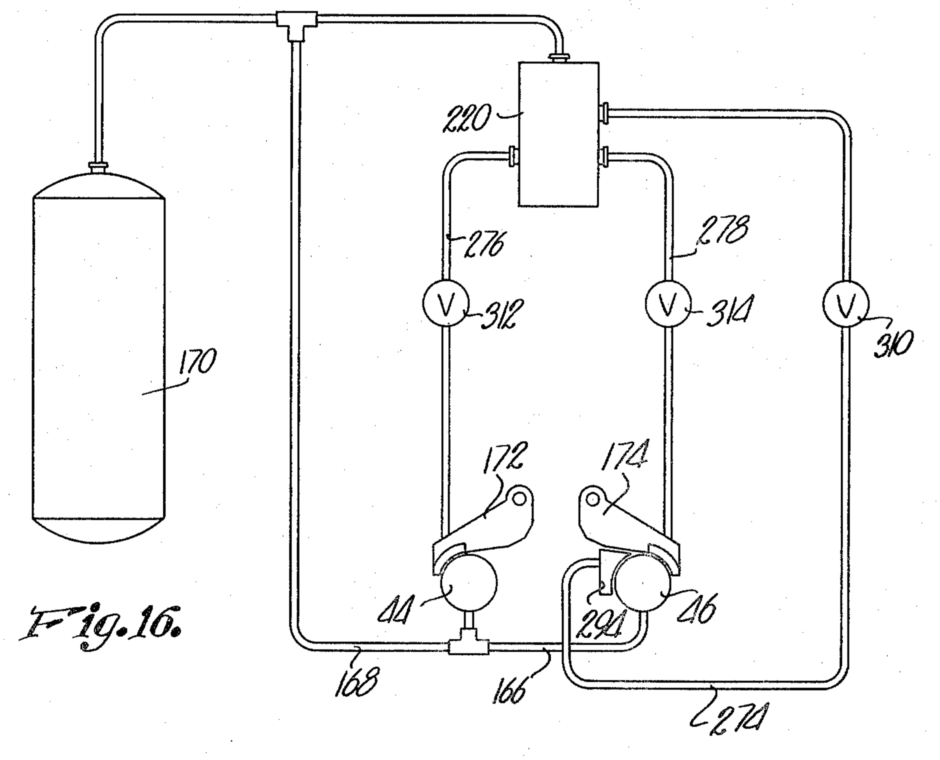
FIG. 16 is a schematic diagram of the pneumatic system interconnecting the capstans and brake with a source of air pressure.

Valve 220 is formed by a pair of side sections 232 and 234 which are mounted on a gasket 236 disposed on the normally uppermost face of base 228. Each section 232 and 234 is provided with a central projection 238 and a pair of end projections 240. The end projections 240 are provided with upper marginal edges 242 which are spaced from the upper marginal edges 244 of sections 232 and 234 so as to prevent a surface upon which a top 246 may be disposed to close valve 220 when sections 232 and 234 are disposed on base 228 so that the end projections 240 of one section are in substantial proximity to corresponding end projections 240 of the other section. Thus, a region is formed at each end of valve 220 when the sections 232 and 234 are disposed in the manner shown in FIGS. 10 to 12 inclusive. Thus, valve 220 is, in essence, divided up into a first valve having a first region 248 and a second valve having the second region 249. A suitable gasket 250 is disposed between edges 242 and top 246 to seal off the interconnection therebetween and to prevent the flow of air outwardly from regions 248 and 249. A spacer 252 is disposed between central projections 238 of sections 232 and 234 so that regions 248 and 249 formed thereby are, therefore, not interconnected.

A vane 254 is provided for each region 248 and 249 and is substantially T-shaped, having a first segment 256 disposed between proximal faces of end projections 240, and a second segment 258 integral with first segment 256 and extending laterally therefrom intermediate the ends thereof. The extremity of second segment 258 opposite to the extremity connected to first segment 256 is disposed between central projections 238 of sections 232 and 234 and normally spaced therefrom. By providing suitable gasket material 260 on opposed sides of first segment 256, vane 254 is substantially clamped between the proximal end projections 240, and vane 254 is permitted to shift slightly so that the extremity of second segment 258 between central projections 238 may move into and out of engagement with the projections 238. It is, therefore, clear that regions 248 and 249, by virtue of the gaskets heretofore enumerated, are air-tight and valve 220 is therefore, divided into a pair of distinct valve units for a purpose hereinafter described.

Section 232 is provided with a pair of fluid passages 262 and 264 therethrough at the central projection 238 thereof. Section 234 is provided with a pair of air passages 266 which are mutually convergent to an opening 268 disposed in central projection 238 of section 234 substantially in alignment with the opening in central projection 238 of section 232 forming one end of passage 262. The extremities of passages 266 opposed to the extremities interconnected at opening 268, provide air openings 270 for placing the regions 248 in fluid communication.

Section 234 is also provided with a fluid passage 272 therethrough, one end of which is disposed between openings 270 of passages 266. A conduit 274 is operably coupled to passage 262, a conduit 276 is operably coupled to passage 264, and a conduit 278 is operably coupled to passage 272. Inlet 230 is in the form of an aperture through base 228 and disposed below one of vanes 254 and proximal to the passage 262 and opening 268.

Means for shifting the vanes 254 comprises coil means 280 surrounding the respective vanes 254, coil means 280 including a pair of electrical coils in a cylindrical unit surrounding the respective vane so that the latter forms the core of the coils. The ends 282 and 284 of the respective coils forming coil means 280, are connected to binding posts 286, which in turn are operably coupled to mechanism for controlling the flow of an electrical impulse through the coils.

A U-shaped magnet 288 is provided with a pair of spaced ends 290 in engagement with sections 232 and 234, the latter being of a material having a high magnetic retentivity. Magnet 288 is secured to valve 220 by means of an elongated screw 292 passing through magnet 288 and into top 246. Thus, sections 232 and 234 are magnetically polarized at all times so long as magnet 288 is in contact therewith.

When electrical impulses are sent to either of the coils of coil means 280, the corresponding vane 254 is polarized magnetically so as to be attracted to one or the other of central projections 238 by virtue of the magnetizing effect of the latter in view of magnet 288. Therefore, it is evident that when current flows into one of the coils of coil means 280, vane 254 is magnetized so that the same shifts into engagement with one of central projections 238, thus closing the corresponding passage therein. By directing an electrical current through the other of the coils of coil means 280, the corresponding vane 254 is shifted in the opposite direction since the coils are disposed to oppositely polarize vane 254. It is therefore evident that vane 254 serves as a valve for the openings in the central projections 238 so that the passages in communication therewith are selectively opened or closed.

A block 294 is mounted on the front face of panel 22 by means of nut and bolt means 296 and block 294 is provided with an arcuate outer surface 298 adapted to partially surround capstan 46. Block 294 is provided with an elongated fluid channel 300 therein, terminating in a plurality of elongated, milled slots 302 and an outlet 304 in alignment with a conduit 306 in panel 22. Block 294 is disposed to direct air through channel 300 and out through slots 302 against tape 30 when the latter passes over head 28 and capstans 44 and 46 so as to force tape 30 into engagement with the normally lower face 308 of arm 174 to thereby stop the movement of tape 30 when the same has been driven by either capstan 44 or capstan 46.

Conduit 274 is adapted to be operably coupled with conduit 306 through a bleed valve 310 hereinafter described so that when air is directed into valve 220 through inlet 230 thereof, and when vane 254 is moved to a position closing opening 268, the air within valve 220 moves through passage 262 and into channel 300 through the conduits 274 and 306. Thus, tape 30 is forced into engagement with face 308 of arm 174 to prevent movement of the tape or to stop the movement thereof.

Conduit 276 is adapted to be operably coupled through a bleed valve 312 identical to bleed valve 310 to conduit means 194 with duct 189 in the member 182 secured to arm 172. Conduit 278 is coupled through a bleed valve 314 to conduit means 194, alignable with the duct 189 of member 182 secured to arm 174 and then to duct 189.

It is obvious that when vane 254 of valve 220 above the inlet 230 thereof closes the passage 262 and thus prevents the flow of air to channel 300 of block 294, air will flow into and through passages 266 and into the corresponding region 248. Depending upon the location of vane 254 in the last mentioned region 248, air will flow from the region into either passage 264 of passage 272. If vane 254 closes passage 264, air will flow into conduit 276 and thence into the duct 189 of member 182 secured to arm 172. If the vane 254 closes the passage 272, air will flow through passage 264 and into the corresponding duct 189 of member 182 secured to arm 174.

Each of bleed valves 310, 312 and 314 are substantially identical and each comprises a body 316 having a fluid channel 318 therethrough between a pair of opposed sides 320 thereof. A bore 322 interconnects channel 318 with a hollow area 324 communicating with the atmosphere surrounding transport 20 by means of outlets 326. An annular extension 328 surrounds bore 322 within area 324 and provides a seat upon which a disc 330 is engageable to close the innermost end of bore 322.

A tubular extension 332 having a bore 334 therein within which is disposed a coil spring 336, mounts a ball 338 which engages one surface of disc 330 and forces the same into closing engagement with bore 322. Electrical coil means 340 surround extension 332 and is comprised of a pair of coils 342 and 344, one of which is adapted to be operably coupled to a source of electrical power. Upon the directing of electrical current through one of the coils 342 or 344, extension 332, being of a material having a high magnetic permeability, is magnetically polarized and attracts disc 330, which is also of a material having a relatively high magnetic permeability. Thus, air flowing through channel 318 is permitted to flow through bore 322 and outwardly from area 324 to the atmosphere surrounding transport 20. When extension 332 is demagnetized, disc 330 returns to a position closing bore 322 under the influence of spring 336 and ball 338.

Figure 17:
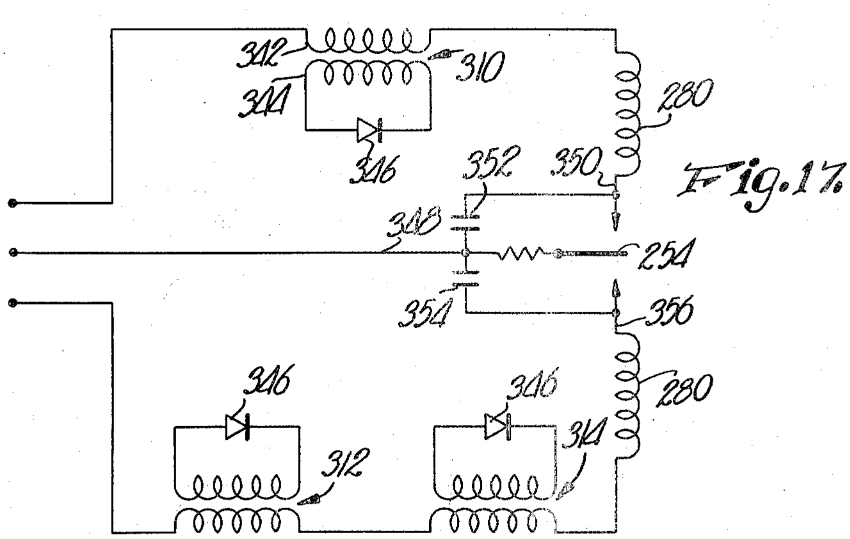
FIG. 17 is a schematic wiring diagram illustrating the electrical interconnections of the control and bleed valves with a source of electrical power.

In FIG. 17, an electrical schematic diagram is shown illustrating the interconnection of coils 342 and 344, and further illustrating a device 346 in the nature of a rectifying element for directing current in one direction only. When current flows through coil 342, extension 332 is magnetically polarized to attract disc 330 to thereby open bore 322. In addition, the current flowing through coil 342 induces a current into coil 344 so as to cause to flow in one direction through device 346. As the flow of current through coil 342 is removed, current will continue to flow in the circuit formed by coil 344 and device 346 for a predetermined time thereafter, depending upon the characteristics of the coil and device. During this predetermined time, disc 330 is maintained in contact with extension 332 to permit air to "bleed" out from passage 318 to the atmosphere.

FIG. 17 further shows the interconnection of coil means 280 corresponding to the coil surrounding the vane 254 above inlet 230. When an electrical impulse of extremely short duration is directed through the circuit containing valve 310 and coil means 280, the vane 254 is magnetically polarized in the manner set forth above by virtue of the interconnection of lead wire 348 with lead wire 350, through a capacitor 352. By shifting vane 254 in the direction of the coil 280 in the circuit with valve 310, lead wire 348 is releasably interconnected with the lead wire 350. Likewise, valves 312 and 314 are placed in series electrically with the other of the coils of coil means 280 so as to shift the vane 254 in the opposite direction when an electrical impulse is impressed in the circuit containing valves 312 and 314, through a capacitor 354 interconnecting lead wire 348, and lead wire 356.

*Operation*

When it is desired to drive tape 30 past head 28, the arms 172 and 174 are swung away from respective capstans 44 and 46 so as to permit the operator of transport 20 to place the tape over head 28 and capstans 44 and 46. Loops 32 and 34 are formed in tape 30 and extend into chambers 40 and 42. Vacuum system 78 is then actuated to provide a predetermined tension on loops 32 and 34.

The actuation of motor 158 is initiated to rotate capstans 44 and 46 continuously including the times when transport 20 is in a stand-by condition. Simultaneously, air is directed from source 170, through pipe 168 and tube 166 so that air issues from capstans 44 and 46 through the porous sleeves 150 thereof. Thus tape 30 is maintained out of engagement with the sleeves 150, but remain in the vicinity of the corresponding capstans 44 and 46 by virtue of the tension imposed thereon by the differential pressures across loops 32 and 34. Arms 172 and 174 are then swung into operative position whereby the members 182 carried thereby, are in substantial overlying relationship to tape 30, and ducts 189 are aligned with conduit means 194.

To drive tape 30 in the forward direction, the same is forced into engagement with capstan 46 by air passing through the appropriate conduits and ducts associated with arm 174. The air issuing from member 182 of arm 174 is of a pressure sufficiently greater than the air pressure issuing from the porous sleeve 150 of capstan 46 to thereby force tape 30 into engagement with the latter. Thus, the tape is driven in the forward direction or clockwise direction as viewed in FIG. 1. As tape enters chamber 42, the loop 34 has a tendency to drop. However, due to the sensing means including transducer 70, loop 34 is maintained substantially at a predetermined null position by the rotation of motor 54 associated with reel 26. Likewise, as tape 30 is driven in the forward direction, loop 32 in chamber 40 has a tendency to rise. This effect is offset by the sensing of the loop position by the corresponding transducer 70 which actuates motor 52 associated with reel 24 to supply additional tape to chamber 40. It is evident that loops 32 and 34 are maintained substantially at the null positions thereof as tape 30 is driven forwardly.

To supply air to the member 182 corresponding to arm 174, vane 254 in region 249 and above the inlet 230, moves to a position blocking the flow of air to passage 262 and thereby conduit 274. Air thus flows into the region 248 through passages 266 and, the other vane 254 in region 248 being in a position to block the flow of air to passage 264, air flows through passage 272, through conduit 276, conduit means 194, and into the appropriate duct 189. Air, therefore, issues through the slots 188 and against tape 30 to force the same into engagement with porous sleeve 150 of capstan 46. Tape 30 is driven in the reverse direction by capstan 44 in the same manner as that described for capstan 46.

To stop the movement of the tape when the same is being driven in a forward direction by capstan 46, or in a reverse direction by capstan 44, the vane 254 above inlet 230 is shifted so as to block opening 268 of passages 266 and thereby open passage 262 to permit air to flow into conduit 274 and thence to channel 300 of block 294. Air issues from slots 302 to force tape 30 into engagement with the face 308 of arm 174, thus immediately stopping the tape. It is evident that the air flow to the capstan which is driving the tape, is cut off when vane 254 moves into a position blocking opening 268. Thus, the braking action of tape 30 takes place simultaneously with the removal of the driving effect imparted thereto by the capstans.

Since it is important to remove the flow of air immediately from either of the drive capstans 44 and 46 when it is desired to supply air to channel 300, valves 312 and 314 are provided to "bleed" off the air flowing to the corresponding capstan. Thus, the effect of the "bleeding" of the air is to immediately remove the flow of air to the member 182 so that the air issuing through the porous sleeve 150 immediately moves the tape 30 out of driving relationship to the capstan. Such bleeding effect occurs when an electrical impulse is directed to the coil means 280 for swinging vane 254 above inlet 230. The same signal is used to open bore 322 of each of valves 312 and 314 to permit air to flow outwardly from the channel 318 corresponding to the capstan which is driving the tape 30.

When tape 30 is in the stand-by condition, vane 254 above inlet 230, closes opening 268 to permit air to flow through passage 262, conduit 274 and into channel 300 to force tape 30 into engagement with face 308. When it is desired to drive tape in either direction, vane 254 above inlet 230, shifts so that the air supplied to passage 262 is removed, and air is immediately directed into passages 266 and thence to the appropriate capstan. Simultaneously therewith, disc 330 of valve 310 is magnetically polarized to open the respective bore 322 and to permit the residual air in conduit 274 to pass to the atmosphere and thus remove any tendency for the tape 30 to be impeded by the flow of air outwardly from channel 300.

Valves 312 and 314 for "bleeding" air supplied to members 182 simultaneous with the directing of air to channel 300 to stop the movement of the tape, might conceivably be eliminated and an alternate method of "bleeding" the residual air may be employed. To this end, the air in the region 248 corresponding to vane 254 for controlling the flow of air to members 182, is exhausted through one member 182 when air flow to the opposite member 182 is to be removed. Thus, when vane 254 in region 249 and above inlet 230 is shifted to supply air to channel 300, the vane 254 in the adjacent region 248 is simultaneously shifted to cut off the flow of air to the capstan driving the tape and thereby open the last-mentioned region 248 to the opposite capstan. Air in the region 248 then flows to member 182 of the opposite capstan until the region 248 is exhausted. The air in the conduit means 194 and conduit 276 continues to flow in the usual manner until air is completely removed therefrom. Since the air remaining in the region 248, in conduit means 194 and conduit 276 is of a limited volume, the air is quickly exhausted to prevent the tape from being driven further than is desired. To accomplish this bleeding effect, the coil means 280 surrounding vanes 254, are interconnected so that when an electrical pulse is directed to coil means 280 corresponding to vane 254 in region 249 and above inlet 230, the same pulse is directed also to the coil means 280 of the adjacent vane 254 to shift the latter to place the corresponding region in fluid communication with the opposite capstan.

It is evident that transport 20 provides a means for more effectively maintaining the tension on tape 30 at a predetermined value throughout the operation of transport 20 and further, that by virtue of the positive air pressures utilized in driving tape 30, a more positive driving effect is attained not heretofore known. In addition, the utilization of positive air pressures to bring the tape 30 to a halt after the same has been driven by either of the capstans, is a distinct improvement over existing methods, especially in view of the fact that the tape is undamaged by the braking effect owing to the fact that the coating on the tape is not contacted by the braking surface.

Having thus described the invention, what is claimed as new and desired to be secured by Letters Patent is:

1. In a digital tape transport, a support; a pair of tape driving capstants rotatably mounted in spaced relationship on said support and each being provided with an air passage therethrough terminating in an outlet; means on said support and operably coupled with said capstans for rotating said capstans in opposite directions; perforated means on each of said capstans across the outlet thereof for passing air outwardly from said passage and for providing a surface engageable with the tape in driving relationship; pneumatic means on said support in fluid communication with each of said passages for continuously directing air under a positive pressure through the latter and outwardly through said perforated means to normally maintain said tape out of engagement with the surface of the latter as said capstans continue to rotate; a pair of arms carried by the support, each of said arms being positioned on said support adjacent to a corresponding capstan and provided with an air duct therethrough disposed to direct air toward the surface of said corresponding capstan; and pneumatic means on said support and in fluid communication with the ducts of said arms for selectively directing air under a pressure greater than said predetermined pressure into and through either of said ducts, whereby said tape is forced into engagement with the surface of the corresponding capstan and driven thereby.

2. In a digital tape transport as set forth in claim 1, wherein each of said arms is swingably mounted on said support and movable from a first position in tape-forcing relationship with the corresponding capstan to a second position spaced from the last-mentioned capstan permitting the removal of the tape from adjacent the capstan, and wherein is included means on said support for swinging said arms.

3. In a digital tape transport as set forth in claim 2, wherein the duct of each arm is provided with an inlet and an outlet and said pneumatic means for directing air into each of said ducts includes conduit means carried by said support and provided with an air outlet, the inlet of each duct being in alignment with the outlet of the corresponding conduit means when the corresponding arm is in said first position.

4. In a digital tape transport as set forth in claim 1, wherein said pneumatic means for directing air into said ducts includes a source of air under pressure and a valve for selectively controlling the flow of air from said source to said ducts, said valve having an inlet communicating with said source and a pair of outlets communicating with the respective ducts, and means within the valve for controlling the flow of air to said outlets.

5. In a digital tape transport as set forth in claim 4, wherein said controlling means includes a vane mounted on said valve for movement from a first location in closing relationship to one of said outlets to a second location in closing relationship to the other of said outlets, and means for moving said vane.

6. In a digital tape transport as set forth in claim 5, wherein said means for moving said vane includes magnetic means for creating a magnetic field in the vicinity of said vane to attract the latter when the same is magnetically polarized, and means for magnetically polarizing said vane.

7. In a digital tape transport, a support; a pair of tape driving capstans rotatably mounted in spaced relationship on said support and each being provided with an air passage therethrough terminating in an outlet and a perforated tape-engaging surface across said outlet; means on said support and operably coupled with said capstans for rotating said capstans in opposite directions; means on said support and operably coupled with each of the capstans for continuously directing air under a predetermined pressure through the corresponding passage, outlet and surface to normally maintain the tape out of engagement with said surfaces as said capstans continue to rotate; means on said support for directing air under a pressure greater than said predetermined pressure against the tape to force the tape into engagement with the surface of either of said capstans and thereby drive the tape in the corresponding direction; and means on said support for forcing the tape into engagement with said support for stopping the tape after the latter has been driven by said forcing means.

8. In a digital tape transport, a support; a pair of tape driving capstans rotatably mounted in spaced relationship on said support and each being provided with an air passage therethrough terminating in an outlet and a perforated tape-enaging surface across said outlet; means on said support and operably coupled with said capstans for rotating said capstans in opposite directions; pneumatic means on said support and operably coupled with each of the capstans for continuously directing air under a predetermined pressure through the corresponding passage, outlet and surface to normally maintain the tape out of engagement with said surfaces as said capstans continue to rotate; pneumatic means on said support for directing air under a pressure greater than said predetermined pressure against the tape to force the tape into engagement with the surface of either of said capstans and thereby drive the tape in the corresponding direction; and positive air pressure means on said support for forcing the tape into engagement with said support for stopping the tape after the latter has been driven by said forcing means.

9. In a digital tape transport; a support having a projection thereon; a pair of tape driving capstans rotatably mounted in spaced relationship on said support and each being provided with a surface engageable with the tape in driving relationship thereto; means on said support and operably coupled with said capstans for rotating said capstans in opposite directions; means on said support and operably coupled with the capstans for maintaining the tape out of engagement with said surfaces as said capstans continue to rotate; means on said support for forcing the tape into engagement with the surface of either of said capstans for driving the tape in the corresponding direction; a brake block carried by said support and provided with an air channel therethrough having an outlet disposed to direct air against said tape and force the same into engagement with the projection on said support; and pneumatic means on said support in fluid communication with said channel for directing air under positive pressure into and through the latter and outwardly from said brake block through said outlet to thereby force the tape into engagement with said projection, whereby the tape may be stopped after the same has been driven by said capstan means.

10. In a digital tape transport, a support; a pair of tape driving capstans rotatably mounted in spaced relationship on said support and each being provided with a surface engageable with the tape in driving relationship thereto; means on said support and operably coupled with the capstans for rotating said capstans in opposite directions; pneumatic means on said support and operably coupled with the capstans for maintaining the tape out of engagement with said surfaces as said capstans continue to rotate; a pair of arms carried by said support, each of said arms being positioned on said support adjacent to a corresponding capstan and provided with an air duct disposed to direct air toward the surface of the corresponding capstan; a brake block carried by said support adjacent one of said arms and provided with an air channel therethrough disposed to direct air against said one arm; and pneumatic means operably coupled with the ducts of said arms and the channel of said brake block for selectively directing air through said ducts and said channel, whereby the tape may be either forced into engagement with one of said surfaces of said capstans and driven thereby or forced into engagement with said one arm to stop the movement thereof after the same has been driven by either of said capstans.

11. In a digital tape transport as set forth in claim 10, wherein said pneumatic means for directing air into said ducts and channel includes a source of air under pressure and valve means for controlling the air from the source to said ducts and said channel, said valve means including a first valve for selectively directing the air either to said ducts or said channel, and a second valve for selectively directing the air either to one of said ducts or the other of the latter.

12. In a digital tape transport as set forth in claim 11, wherein each of said valves is provided with an air inlet and a pair of air outlets, the inlet of said first valve being in fluid communication with the source of air, one of said outlets of said first valve being in fluid communication with said channel and the other of said outlets thereof being in fluid communication with the inlet of said second valve, each of the outlets of said second valve being secured to a respective duct, and means in each valve for closing the outlets thereof.

13. In a digital tape transport as set forth in claim 12, wherein said closing means includes a vane mounted on the corresponding valve for movement relative thereto from a first position closing one outlet thereof to a second position closing the other outlet thereof, and means for moving the vane.

14. In a digital tape transport as set forth in claim 13, wherein said second valve is provided with a region within which the corresponding vane is disposed, and wherein is included means for shifting the vane in said second valve to remove the air flow to one of said ducts from said region responsive to the shifting of the vane of said first valve to the position closing the outlet of the latter in fluid communication with the inlet of said second valve, whereby the residual air in said region is directed outwardly from the latter through the opposite duct.

15. In a digital tape transport as set forth in claim 11, wherein is included conduit means for each outlet of said second valve for placing the latter in fluid communication with the corresponding duct, and bleed valve means interposed in said conduit means for providing a path for air within the latter to the atmosphere.

16. In a digital tape transport as set forth in claim 15, wherein said bleed valve means includes a body having a fluid passage therethrough, a member shiftable from a position closing said passage to a position opening the latter, and means responsive to an electrical impulse for shifting said member and maintaining the same in the position opening the passage for a predetermined time after said impulse has been removed, the member being normally urged in the position closing said passage.

17. In a digital tape transport as set forth in claim 16, wherein said member comprises a disc and said shifting means includes a pair of electrical coils, one of said coils adapted to be operably coupled to a source of electrical power for receiving said impulse, the other of said coils being operably coupled with said one coil and a device for maintaining a flow of current in said other coil after said impulse has been removed.

18. In a digital tape transport, a support; a pair of tape driving capstans rotatably mounted on said support and each being provided with a surface engageable with the tape in driving relationship thereto; means on said support for rotating said capstans in opposite directions; a source of air under positive pressure; means operably coupled with the capstans and said source for normally maintaining the tape out of engagement with said surfaces by positive air pressure as said capstans continue to rotate; means coupled with said source for forcing the tape into engagement with the surface of either of said capstans by positive air pressure for driving the tape in the corresponding directions; and tape-loop forming means on said support and responsive to the location of the tape loop relative to a predetermined position on said support for maintaining a predetermined tension on said tape and for substantially maintaining the loop of said tape at a predetermined location as the tape is either being maintained out of engagement with said surfaces or being driven by the latter in the corresponding directions.

19. In a digital tape transport as set forth in claim 18, wherein said tension means on said support includes an open, evacuated chamber for receiving said tape in a looped condition and provided with an elongated wall having a plurality of spaced aligned perforations therein, pressure sensing means exterior to said chamber and in fluid communication therewith through the perforations in said wall for substantially instantaneously sensing the position of the loop relative to a point intermediate the ends of the wall; and means for supplying tape to or removing tape from said chamber responsive to said pressure sensing means to maintain said tape loop at said predetermined location.

20. In a digital tape transport as set forth in claim 19, wherein said pressure sensing means includes a manifold, and a transducer operably coupled with the manifold for changing a pneumatic signal to an electrical signal, said supplying and removing means being operably coupled with said transducer.

21. In a web advancing mechanism:
- a capstan having means for rotating the same;
- a member spaced from the periphery of the capstan whereby the web to be advanced may be disposed between the capstan and the member;
- means for providing a flow of air under pressure for each of said capstan and said member respectively and for directing said flows outwardly from the capstan and the member against opposed sides of the web; and
- structure for producing a pressure differential in said flows of air as said flows are simultaneously provided for and directed outwardly of the member and the capstan whereby the web is moved into and out of driving engagement with the periphery of the capstan.

22. The invention of claim 21, and means mounting the member for movement toward and away from the web.

23. The invention of claim 21, the pressure of the air emanating from the capstan being constant, said structure comprising means for varying the pressure of the air emanating from the member.

24. The invention of claim 23, and means for bleeding the air from the member upon reduction of the pressure of the air emanating therefrom.

25. The invention of claim 21, and a brake for the web including means for directing air under pressure against the web in a direction to force the latter into engagement with the member upon variance in said differential such as to move the web out of engagement with the capstan, said last-mentioned means augmenting the force of the air emanating from the capstan.

26. In a web advancing mechanism;

a rotatable capstan disposed on one side of a web to be advanced;

means for directing air under positive pressure to and outwardly from the capstan and against said one side of the web;

a member disposed on the opposite side of the web to be advanced;

means for directing air under positive pressure to and outwardly from the member and against the opposite side of the web;

structure separate from said capstan for directing web braking air under positive pressure against said one side of the web;

means for producing a pressure differential in the air as the air is simultaneously directed to the member and the capstan whereby the web is moved into and out of driving engagement with the capstan;

control means for rendering said structure operable upon a variance in said differential such as to move the web out of engagement with the capstan; and stationary means spaced from said opposite side of the web whereby during operation of said structure the web is forced against said stationary means by the pressure of the air emanating from the structure.

27. In a tape advancing mechanism, a support; a tape driving capstan rotatably mounted on said support and being provided with a surface engageable with the tape in driving relationship thereto; means on said support for rotating said capstan; first means on said support for continuously conducting air in one direction across the path of said tape to normally maintain the tape out of engagement with said surface as said capstan continues to rotate; and second means on said support for selectively conducting air in the opposite direction across said path and for overcoming the effect of said first means on said tape to force the tape into engagement with the surface and thereby drive the tape in the corresponding direction as said first means continues to conduct air in said one direction.

28. In a digital tape transport, a support; a tape driving capstan rotatably mounted on said support and being provided with an air passage therethrough terminating in an outlet; means on said support and operably coupled with said capstan for rotating the latter; perforated means on said capstan across the outlet thereof for passing air outwardly from said passage and for providing a surface engageable with the tape in driving relationship thereto; pneumatic means on said support in fluid communication with said passage for continuously directing air under a positive pressure through the latter and thereby through said perforated means against one side of the tape to normally maintain said tape out of engagement with the surface as said capstan continues to rotate; and pneumatic means on said support for directing air under a pressure greater than the pressure of the air passing through said passage against the opposite side of said tape to selectively force the tape into engagement with the surface of said capstan and thereby drive the tape in the corresponding direction of rotation of the capstan.

29. In a digital tape transport as set forth in claim 28, wherein said capstan comprises a tubular element rotatably mounted on the support and a spool secured to said element at one end of the latter, said spool having a radially extending air passage therethrough in fluid communication with said element.

30. In a digital tape transport as set forth in claim 29, wherein said perforated means includes a porous sleeve mounted on said spool at the periphery of the latter, said rotating means being operably coupled with said element adjacent the opposite end thereof.

31. In a digital tape transport as set forth in claim 29, wherein said pneumatic means for directing air to said passage includes a source of air under pressure in fluid communication with said element at the opposite end thereof.

32. In a digital tape transport:

a support;

a pair of tape driving capstans rotatably mounted in spaced relationship on said support and each being provided with a surface engageable with the tape in driving relationship thereto;

means on said support and operably coupled with said capstans for rotating said capstans in opposite directions;

means on said support and operably coupled with the capstans for maintaining the tape out of engagement with said surfaces as said capstans continue to rotate;

first means on said support for forcing the tape into engagement with the surface of either of said capstans for driving the tape in the corresponding direction, said first means including a braking surface; and second means on said support delivering positive air pressure to force the tape into engagement with said braking surface of said first means to stop the tape after the latter has been driven by said first means.

References Cited by the Examiner

UNITED STATES PATENTS

| | | | |
|---|---|---|---|
| 2,778,634 | 1/57 | Gams et al. | 226—95 |
| 2,852,253 | 9/58 | Pouliart et al. | 226—95 |
| 2,866,637 | 12/58 | Pendleton | 226—95 |
| 2,919,076 | 12/59 | Buslik et al. | 242—55.12 |
| 2,921,753 | 1/60 | Lahti et al. | 242—55.12 |
| 2,927,606 | 3/60 | Matchett et al. | 137—608 |
| 2,954,911 | 10/60 | Baumeister et al. | 226—95 |
| 2,969,087 | 1/61 | Raney | 137—608 |
| 2,995,149 | 8/61 | Pendleton | 226—95 X |

SAMUEL F. COLEMAN, *Primary Examiner.*

HARRISON R. MOSELEY, ANDRES H. NIELSEN, RAPHAEL M. LUPO, *Examiners.*